(12) United States Patent
Kung et al.

(10) Patent No.: US 9,013,414 B2
(45) Date of Patent: Apr. 21, 2015

(54) TOUCH PANEL DISPLAY SYSTEM AND DRIVING METHOD THEREOF

(75) Inventors: Chen-Pang Kung, Jhongli (TW);
Yu-Jen Chen, Fangliao Shiang (TW);
Chen-Wei Lin, Kaohsiung (TW)

(73) Assignee: Industrial Technology Research Institute, Chutung (TW)

( * ) Notice: Subject to any disclaimer, the term of this patent is extended or adjusted under 35 U.S.C. 154(b) by 395 days.

(21) Appl. No.: 12/687,869

(22) Filed: Jan. 14, 2010

(65) Prior Publication Data

US 2010/0207900 A1    Aug. 19, 2010

(30) Foreign Application Priority Data

Feb. 16, 2009   (TW) ................................ 98104795 A

(51) Int. Cl.
*G06F 3/041*   (2006.01)
(52) U.S. Cl.
CPC ..................................... *G06F 3/0412* (2013.01)
(58) Field of Classification Search
CPC ..................................................... G06F 3/0412
USPC .......................................................... 345/173
See application file for complete search history.

(56) References Cited

U.S. PATENT DOCUMENTS

| 2003/0051927 | A1* | 3/2003 | Inamori ..................... 178/18.01 |
| 2004/0100450 | A1* | 5/2004 | Choi ............................ 345/173 |
| 2006/0103634 | A1  | 5/2006 | Kim et al. |
| 2006/0103635 | A1* | 5/2006 | Park ............................ 345/173 |

FOREIGN PATENT DOCUMENTS

TW           M345293         11/2008

OTHER PUBLICATIONS

Office Action of corresponding TW application issued on Aug. 23, 2012.

* cited by examiner

*Primary Examiner* — Amare Mengistu
*Assistant Examiner* — Sarvesh J Nadkarni
(74) *Attorney, Agent, or Firm* — Wang Law Firm, Inc.; Li K. Wang; Stephen Hsu

(57) ABSTRACT

A touch panel display system and driving method thereof is provided. The touch panel display system includes a display device and a display circuit coupled to the display device for driving a display position of the display device. The system further includes a sensing device coupled to the display device for sensing an contact pressure, and a sensing circuit coupled to the sensing device for driving a sensing position of the sensing device. The system further includes a synchronous controller coupled to the display circuit and the sensing circuit for synchronously controlling the display circuit and the sensing circuit such that the display position and the sensing position are not overlapped and maintained beyond a predetermined distance.

12 Claims, 2 Drawing Sheets

TOUCH PANEL DISPLAY SYSTEM AND DRIVING METHOD THEREOF

CROSS REFERENCE TO RELATED APPLICATION

This Application claims priority of Taiwan Patent Application No. 98104795, filed on Feb. 16, 2009, the entirety of which is incorporated by reference herein.

BACKGROUND

1. Technical Field

The disclosure relates to a display system, and in particular relates to a touch panel display system and driving method thereof.

2. Description of the Related Art

A conventional touch panel display system is as shown in FIG. 1. The display driving circuit 120 and the sensor driving circuit 140 are separated and operated concurrently. Therefore, during operation, the driving position of the display 110 and the touch sensor 130 tend to be overlapped or in close proximity. Meanwhile, because refreshing frames of the display 110 are according to the electrical characteristics of transistors or a display medium, high voltage or large current are used for driving. When a conventional touch panel display is driven, a noise is created due to the coupling effect caused by the driving elements, display medium or coupled capacitors between electrodes or electrical characteristic variations of the display medium. If the driving position of the touch sensor 130 is in close proximity with or overlapped with the driving position of the display 110, the noise will affect the sensor 130 and reduce the signal-noise ratio of the sensing signal. Specifically, the sensor 130 is greatly affected with noise when the display panel 140 and the sensor panel 130 are closer in proximity due to contact pressure.

SUMMARY

A detailed description is given in the following embodiments with reference to the accompanying drawings.

In an embodiment the disclosure provides a touch panel display system. The touch panel display system comprises: a display device; a display circuit, coupled to the display device for driving a display position of the display device; and a sensing device, coupled to the display device for sensing a contact pressure. A sensing circuit, coupled to the sensing device for driving a sensing position of the sensing device, and a synchronous controller, coupled to the display circuit and the sensing circuit for synchronously controlling the display circuit and the sensing circuit such that the display position and the sensing position are not overlapped and maintained beyond a predetermined distance are also provided.

In an embodiment the disclosure provides a driving method for a touch panel display. The method comprises the steps of: driving a display position of a display device; driving a sensing position of a sensing device; and controlling the display device and the sensing device synchronously such that the display position and the sensing position are not overlapped and maintained beyond a predetermined distance.

BRIEF DESCRIPTION OF DRAWINGS

The embodiment can be more fully understood by reading the subsequent detailed description and examples with references made to the accompanying drawings, wherein.

DETAILED DESCRIPTION OF INVENTION

Figure 1:
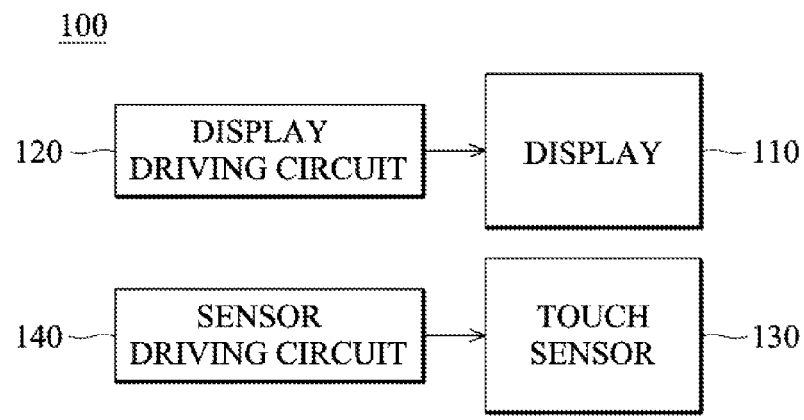
FIG. 1 is a diagram showing the structure of a conventional touch panel display system.

In the following detailed description, for purposes of explanation, numberous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
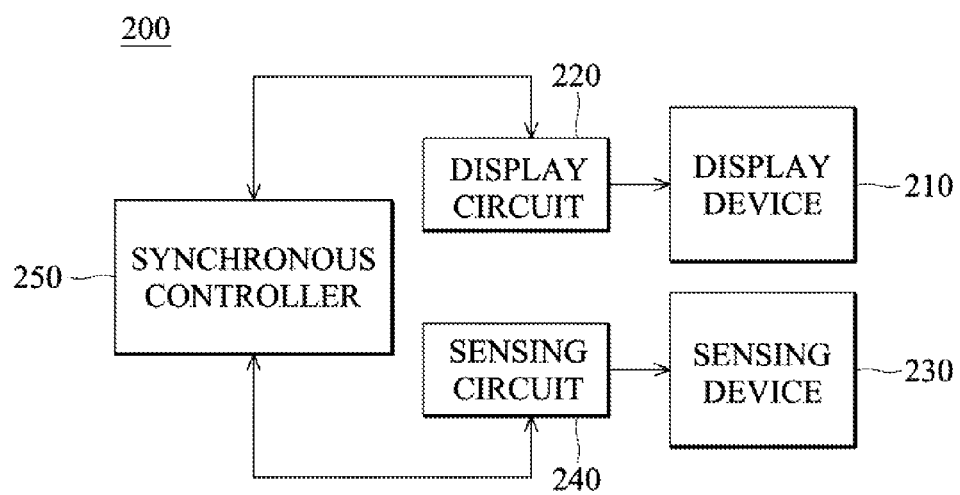
FIG. 2 is a schematic diagram showing the structure of a touch panel display system of an embodiment.

FIG. 2 is a schematic diagram showing the structure of a touch panel display system of an embodiment. The touch panel display system 200 comprises a display device 210, a display circuit 220, a sensing device 230, a sensing circuit 240 and a synchronous controller 250.

The display device 210 can be a liquid crystal display panel or a cell phone display panel etc. The display circuit 220 coupled inside of the display device 210 is used to drive scanning lines and data lines of the display device 210 and driving frequencies thereof. Namely, the display circuit 220 drives the display position and display frequency of the display device 210 such that the display device 210 can continuously generate screen frames. The sensing device 230, in the embodiment, is a sensor film but is not limit thereto. The sensing device 230 is usually adhered to the surface of the display device 210 to sense a contact pressure. The sensing circuit 240 coupled inside the sensing device 230 is used to drive the X and Y axial of the scanning lines for sensing and frequency thereof. Namely to driving the sensing position and sensing frequency of the sensing device 230 to detect the position of the contact pressure.

The synchronous controller 250 can be an independent analog/digital circuit, or may be a single chip or a microprocessor including several control units, able to receive, process, and transmit various signals. In the embodiment, the synchronous controller 250 determines whether the display position and the sensing position are overlapped or maintained beyond a predetermined distance by detecting driving signals of the display circuit 220 and the sensing circuit 240 to monitor the current display position and sensing position of the system. The predetermined distance is defined according to a condition when the driving signals of the display position and the sensing position cause minimal coupling effect. When the display position and the sensing position are in proximity with each other so that the driving signals interfere with each other, the synchronous controller 250 will temporarily stop driving the display circuit 220 or the sensing circuit 240, for example, to stop driving display frequency or sensing frequency of the sensing device such that the display position and the sensing position are separated with a distance due to the separation of the timing sequence. In another embodiment, the synchronous will temporarily speed up driving the display circuit 220 or the sensing circuit 240, for example, to speed up driving display frequency or sensing frequency such that the display position and the sensing position are separated with a distance due to the separation of the timing sequence.

In another embodiment, the synchronous controller 250 is activated only when the sensing device 240 detects a contact pressure. When a contact pressure is detected, the sensing device 240 is pressed closer to the display device 210. If the driving signals of the display device 210 and the sensing device 220 do not interfere with each other, then the synchronous controller 250 can be alternatively activated.

Figure 3:
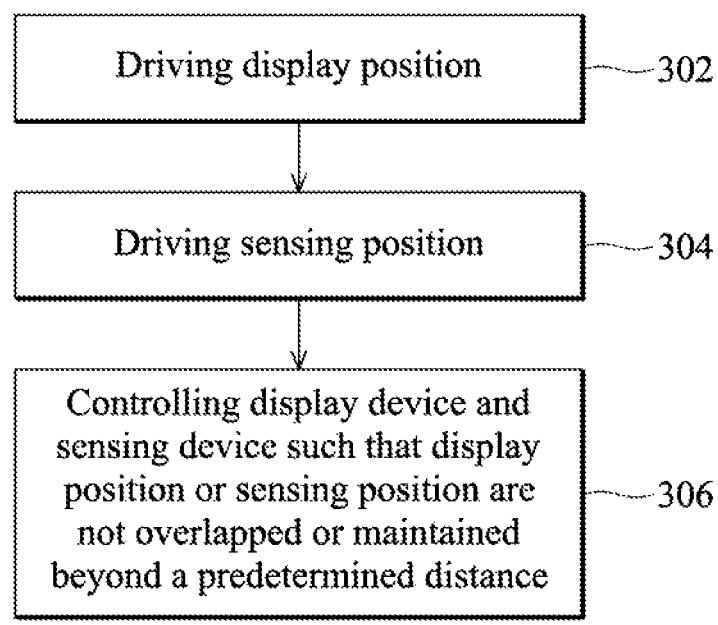
FIG. 3 is a flowchart illustrating the driving method for a touch panel display according to an embodiment.

FIG. 3 is a flowchart illustrating the driving method for a touch panel display according to an embodiment. To begin at step 302, the touch panel display system 200 drives the display position or display frequency of the display device 210. The display circuit 220 issues a driving signal to drive the display position of the display device 210 for continuously showing screen frames. At step 304, the sensing device 230 drives the sensing position or sensing frequency of the sensing device. Specifically, the sensing circuit 240 issues a driving signal to drive the sensing position of the sensing device 230 to detect a contact pressure. Next, at step 306, the synchronous controller 250 controls the display device 210 and the sensing device 230 simultaneously such that the display position and the sensing position are not overlapped or maintained beyond a predetermined distance. In the embodiment, the synchronous controller 250 continuously monitors the display position and the sensing position to determine whether both positions are separated beyond the predetermined distance. When the positions are not beyond the predetermined distance, the synchronous controller 250 will temporarily stop driving the display frequency or sensing frequency such that the display position and the sensing position are separated beyond the predetermined distance, or the synchronous controller 250 will temporarily speed up driving the display frequency or sensing frequency such that the display position and the sensing position are separated beyond the predetermined distance.

In another embodiment, when the outside force touches the display device 210 or the sensing device 230 detects contact pressure, the synchronous controller 250 monitors whether the display position and the sensing position are overlapped or maintained beyond the predetermined distance, then determines whether to proceed with the control method of the invention. When the devices are not touched, then the synchronous controller 250 can alternatively be activated to monitors the display position and the sensing position of the system.

While the disclosure has been described by way of example and in terms of the embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel display system, comprising:
a display device;
a display circuit, coupled to the display device, for driving a display position of the display device;
a sensing device, coupled to the display device, for sensing a contact pressure;
a sensing circuit, coupled to the sensing device, for driving a sensing position of the sensing device, and
a synchronous controller, coupled to the display circuit and the sensing circuit, and monitoring the display position and the sensing position for synchronously controlling the display circuit and the sensing circuit such that the display position and the sensing position are not overlapped and maintained beyond a predetermined distance,
wherein the synchronous controller determines a distance between the display position and the sensing position after the sensing device senses the contact pressure and stops driving the display circuit when the distance between the display position and the sensing position is less than the predetermined distance, and the predetermined distance is not zero.

2. The touch panel display system as claimed in claim 1, wherein the synchronous controller instructs the sensing circuit to temporarily stop driving the sensing position until the display position and the sensing position are maintained beyond the predetermined distance when the distance between the display position and sensing position is less than the predetermined distance.

3. The touch panel display system as claimed in claim 1, wherein the synchronous controller instructs the display circuit or the sensing circuit to temporarily speed up driving the display position or the sensing position until the display position and the sensing position are maintained beyond the predetermined distance when the distance between the display position and sensing position is less than the predetermined distance.

4. The touch panel display system as claimed in claim 1, wherein the synchronous controller is activated when the outside touch is determined.

5. The touch panel display system as claimed in claim 1, wherein the distance between the display position and the sensing position is measured on a display surface of the touch panel display.

6. The touch panel display system as claimed in claim 1, wherein the distance between the display position and the sensing position is obtain by detecting driving signals of the display circuit and the sensing circuit to monitor the current display position and the sensing position.

7. A driving method for a touch panel display, comprising:
driving a display position of a display device;
driving a sensing position of a sensing device;
monitoring the display position and the sensing position;
controlling the display device and the sensing device synchronously such that the display position and the sensing position are not overlapped and maintained beyond a predetermined distance;
determining a distance between the display position and the sensing position after the sensing device senses a contact pressure; and
stopping driving a display circuit when the distance between the display position and the sensing position is less than the predetermined distance,
wherein the predetermined distance is not zero.

8. The driving method for a touch panel display as claimed in claim 7, wherein the controlling the display device and the sensing synchronously further comprises
stopping a sensing circuit coupled to the sensing device temporarily until the display position and the sensing position are maintained beyond the predetermined distance when the distance between the display position and the sensing position is less than the predetermined distance.

9. The driving method for a touch panel display as claimed in claim 7, wherein the controlling the display device and the sensing synchronously comprises:
speeding up driving a display circuit coupled to the display device or a sensing circuit coupled to the sensing device temporarily until the display position and the sensing position are maintained beyond the predetermined distance when the distance between the display position and the sensing position is less than the predetermined distance.

10. The driving method for a touch panel display as claimed in claim 7, further comprising:

determining whether there is an outside touch existing to determine whether to activate the synchronous controller.

11. The driving method for a touch panel display as claimed in claim 7, wherein the distance between the display position and the sensing position is measured on a display surface of the touch panel display.

12. The driving method for a touch panel display as claimed in claim 7, wherein the distance between the display position and the sensing position is obtain by detecting driving signals of the display circuit and the sensing circuit to monitor the current display position and the sensing position.

\* \* \* \* \*